(12) United States Patent
Takahashi

(10) Patent No.: US 10,550,830 B2
(45) Date of Patent: Feb. 4, 2020

(54) CRYOPUMP

(71) Applicant: Sumitomo Heavy Industries, Ltd., Tokyo (JP)

(72) Inventor: Kakeru Takahashi, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 333 days.

(21) Appl. No.: 15/399,488

(22) Filed: Jan. 5, 2017

(65) Prior Publication Data

US 2017/0198684 A1 Jul. 13, 2017

(30) Foreign Application Priority Data

Jan. 8, 2016 (JP) .................................. 2016-002490

(51) Int. Cl.
*F04B 37/08* (2006.01)
*B01D 8/00* (2006.01)

(52) U.S. Cl.
CPC ................ *F04B 37/08* (2013.01); *B01D 8/00* (2013.01)

(58) Field of Classification Search
CPC .................................. B01D 8/00; F04D 37/08
USPC ........................................................ 62/55.5
See application file for complete search history.

(56) References Cited

U.S. PATENT DOCUMENTS

| | | | |
|---|---|---|---|
| 2008/0168778 A1 | 7/2008 | Bartlett et al. | |
| 2010/0115971 A1 | 5/2010 | Tsuyuki | |
| 2014/0130523 A1* | 5/2014 | Takahashi | F04B 37/08 62/55.5 |
| 2014/0345300 A1* | 11/2014 | Takahashi | F04B 37/085 62/55.5 |

FOREIGN PATENT DOCUMENTS

| | | |
|---|---|---|
| JP | S59-174379 U1 | 11/1984 |
| JP | H04-187873 A | 7/1992 |
| JP | H06-033874 A | 2/1994 |
| JP | 2012-237262 A | 12/2012 |
| JP | 5254993 B2 | 8/2013 |
| WO | WO-2008/088794 A2 | 7/2008 |
| WO | WO-2009/013807 A1 | 1/2009 |

* cited by examiner

*Primary Examiner* — Tareq Alosh
(74) *Attorney, Agent, or Firm* — Michael Best & Friedrich LLP

(57) ABSTRACT

A cryopump includes a second cryopanel unit which is thermally connected to a second cooling stage of a cryocooler, a radiation shield which includes a shield main opening, a shield side opening, and a shield bottom opening, and a cryopump housing having a housing bottom portion which faces the shield bottom opening. A dimension of the shield bottom opening is larger than a distance from the second cryopanel unit to the housing bottom portion.

14 Claims, 3 Drawing Sheets

CRYOPUMP

RELATED APPLICATIONS

Priority is claimed to Japanese Patent Application No. 2016-002490, filed Jan. 8, 2016, the entire content of which is incorporated herein by reference.

BACKGROUND

Technical Field

A certain embodiment of the present invention relates to a cryopump.

Description of Related Art

A cryopump is a vacuum pump which condenses or adsorbs gas molecules on a cryopanel cooled to a cryogenic temperature to capture and exhaust the gas molecules. In general, the cryopump is used to realize a clean vacuum environment which is required in a semiconductor circuit manufacturing process or the like. For example, in one of applications of the cryopump like an ion implantation process, most of gases to be exhausted may be a non-condensable gas such as hydrogen. The non-condensable gas can be exhausted by being adsorbed to an adsorption region cooled to a cryogenic temperature.

SUMMARY

According to an aspect of the present invention, there is provided a cryopump, including: a cryocooler which includes a first cooling stage which is cooled to a first cooling temperature, a second cooling stage which is cooled to a second cooling temperature which is lower than the first cooling temperature, and a cryocooler structural portion which structurally supports the second cooling stage to the first cooling stage; a cryopanel unit which is thermally connected to the second cooling stage; a radiation shield which includes a shield main opening, a shield side opening, and a shield bottom opening, encloses the second cooling stage and the cryopanel unit, and is thermally connected to the first cooling stage in a state where the cryocooler structural portion is inserted into the shield side opening; and a cryopump housing which encloses the radiation shield and has a housing bottom portion which faces the shield bottom opening. A dimension of the shield bottom opening is larger than a distance from the cryopanel unit to the housing bottom portion.

DETAILED DESCRIPTION

Figure 1:
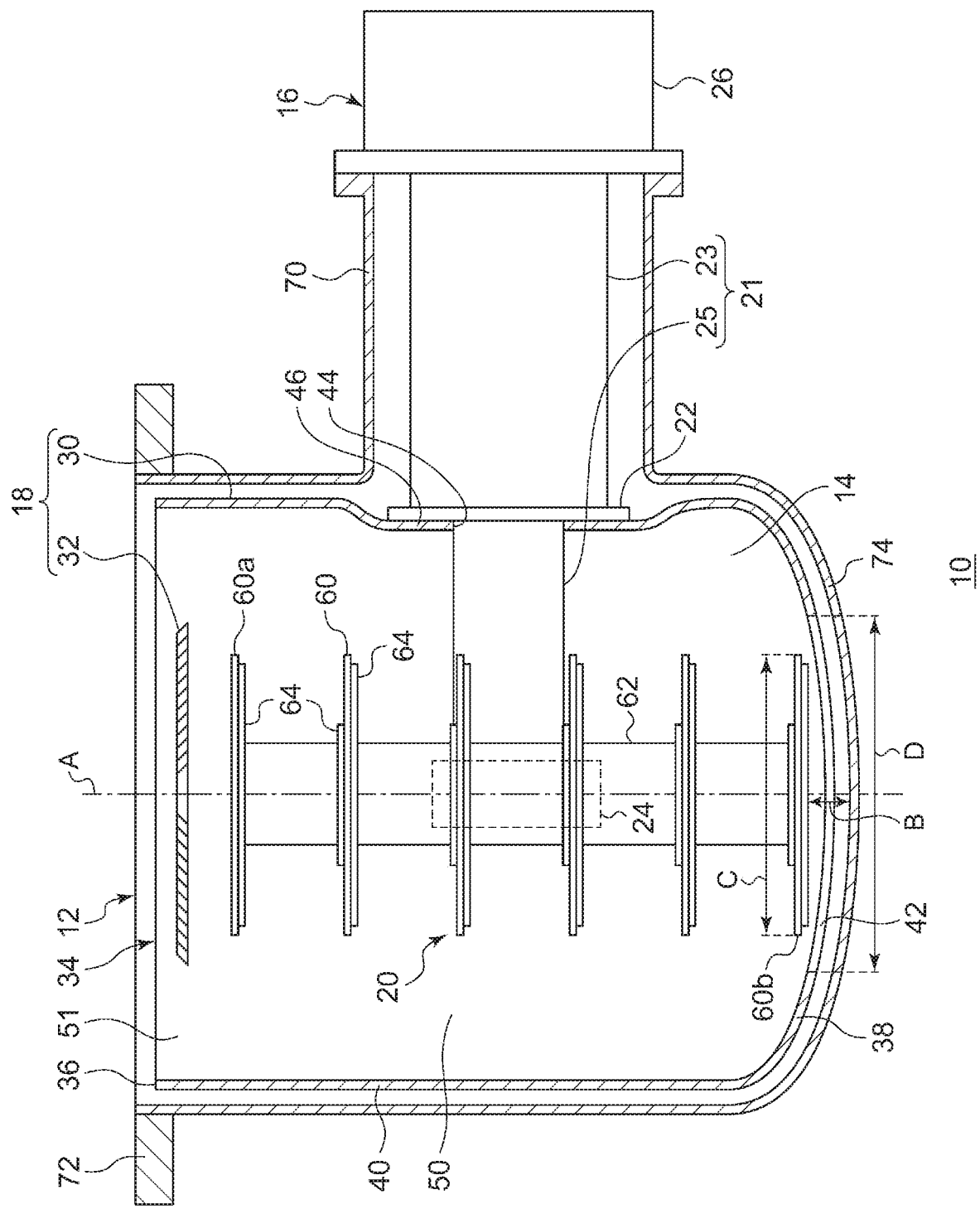
FIG. 1 is a view schematically showing a cryopump according to a first embodiment of the present invention.

It is desirable to improve exhaust performance of a non-condensable gas of a cryopump.

In addition, arbitrary combinations of the above-described components, or components or expression of the present invention may be replaced by each other in methods, devices, systems, or the like, and these replacements are also included in aspects of the present invention.

According to the present invention, exhaust performance of a non-condensable gas of a cryopump is improved.

Hereinafter, embodiments of the present invention will be described in detail with reference to the drawings. In addition, in descriptions, the same reference numerals are assigned to the same components, and overlapping descriptions thereof are appropriately omitted. Moreover, the following configurations are exemplified and the present invention is not limited by the configurations.

FIG. 1 is a view schematically showing a cryopump 10 according to a first embodiment of the present invention. For example, the cryopump 10 is attached to a vacuum chamber of an ion injection apparatus, a sputtering apparatus, a vapor deposition apparatus, or other vacuum processing apparatuses, and is used to increase a vacuum degree inside the vacuum chamber to a required for a desired vacuum process. The cryopump 10 includes an intake port 12 to receive gas to be exhausted from the vacuum chamber. The gas enters an internal space 14 of the cryopump 10 through the intake port 12.

In addition, hereinafter, terms such as an "axial direction" and a "radial direction" are used to easily indicate positional relationships of components of the cryopump 10. The axial direction indicates a direction (a direction along the center axis A in FIG. 1) passing through the intake port 12, and the radial direction indicates a direction (a direction perpendicular to the center axis A) along the intake port 12. For convenience, a side relatively close to the intake port 12 in the axial direction may be referred to as an "upper side", and a side relatively far from the intake port 12 may be referred to as a "lower side". That is, a side relatively far from the bottom portion of the cryopump 10 may be referred to as the "upper side", and a side relatively close to the bottom portion may be referred to as the "lower side". A side close to the center (the center axis A in FIG. 1) of the intake port 12 in the radial direction may be referred to as an "inner side", and a side close to the peripheral edge of the intake port 12 may be referred to as an "outer side". In addition, the above-described expressions are not related to the disposition of the cryopump 10 when the cryopump 10 is attached to the vacuum chamber. For example, the cryopump 10 may be attached to the vacuum chamber in a state where the intake port 12 is positioned downward in a vertical direction.

In addition, a direction surrounding the axial direction may be referred to a "circumferential direction". The circumferential direction is a second direction along the intake port 12 and is a tangential direction orthogonal to the radial direction.

The cryopump 10 includes a cryocooler 16, a first cryopanel unit 18, a second cryopanel unit 20, and a cryopump housing 70.

For example, the cryocooler 16 is a cryocooler such as a Gifford McMahon type cryocooler (so-called GM cryocooler). The cryocooler 16 is a two-stage cryocooler. Accordingly, the cryocooler 16 includes a first cooling stage 22 and a second cooling stage 24. The cryocooler 16 is configured so as to cool the first cooling stage 22 to a first cooling temperature and cool the second cooling stage 24 to a second cooling temperature. The second cooling temperature is lower than the first cooling temperature. For example, the first cooling stage 22 is cooled to approximately 65K to 120K, preferably, 80K to 100K, and the second cooling stage 24 is cooled to approximately 10K to 20K.

In addition, the cryocooler 16 includes a cryocooler structural portion 21 which structurally supports the second cooling stage 24 to the first cooling stage 22 and structurally supports the first cooling stage 22 to a room-temperature portion 26 of the cryocooler 16. Accordingly, the cryocooler structural portion 21 includes a first cylinder 23 and a second cylinder 25 which coaxially extend in the radial direction. The first cylinder 23 connects the room-temperature portion 26 of the cryocooler 16 to the first cooling stage 22. The second cylinder 25 connects the first cooling stage 22 to the second cooling stage 24. The room-temperature portion 26, the first cylinder 23, the first cooling stage 22, the second cylinder 25, and the second cooling stage 24 are linearly arranged in this order.

A first displacer and a second displacer (not shown) are respectively disposed inside the first cylinder 23 and the second cylinder 25 so as to be reciprocated. A first regenerator and a second regenerator (not shown) are respectively incorporated into the first displacer and the second displacer. Moreover, the room-temperature portion 26 includes a drive mechanism (not shown) for reciprocating the first displacer and the second displacer. The drive mechanism includes a flow path switching mechanism which switches a flow path of a working gas (for example, helium) such that the working gas is repeatedly supplied to or discharged from the inside of the cryocooler 16 periodically.

The cryocooler 16 is connected to a compressor (not shown) of the working gas. The cryocooler 16 expands the working gas compressed by the compressor inside the cryocooler 16 to cool the first cooling stage 22 and the second cooling stage 24. The expanded working gas is recovered to the compressor so as to be compressed again. The cryocooler 16 repeats a thermal cycle which includes supplying and discharging of the working gas and reciprocations of the first displacer and the second displacer synchronized with the supplying and the discharging, and generates chill.

The shown cryopump 10 is a so-called horizontal cryopump. In general, the horizontal cryopump is a cryopump in which the cryocooler 16 is disposed to intersect (generally, to be orthogonal to) the center axis A of the cryopump 10.

The first cryopanel unit 18 includes a radiation shield 30 and an inlet cryopanel 32, and encloses the second cryopanel unit 20. The first cryopanel unit 18 provides a cryogenic surface to protect the second cryopanel unit 20 from radiant from the outside of the cryopump 10 or the cryopump housing 70. The first cryopanel unit 18 is thermally connected to the first cooling stage 22. Accordingly, the first cryopanel unit 18 is cooled to the first cooling temperature. The first cryopanel unit 18 has a gap between the first cryopanel unit 18 and the second cryopanel unit 20, and the first cryopanel unit 18 is not in contact with the second cryopanel unit 20. The first cryopanel unit 18 is not in contact with the cryopump housing 70.

The radiation shield 30 is provided to protect the second cryopanel unit 20 from the radiant heat of the cryopump housing 70. The radiation shield 30 is positioned between the cryopump housing 70 and the second cryopanel unit 20, and surrounds the second cryopanel unit 20. The radiation shield 30 includes a shield main opening 34 for receiving a gas from the outside of the cryopump 10 to the internal space 14. The shield main opening 34 is positioned at the intake port 12.

The radiation shield 30 includes a shield front end 36 which defines the shield main opening 34, a shield bottom portion 38 which is positioned on aside opposite to the shield main opening 34, and a shield side portion 40 which connects the shield front end 36 to the shield bottom portion 38. The shield side portion 40 extends from the shield front end 36 to the side opposite to the shield main opening 34 in the axial direction, and extends to surround the second cooling stage 24 in the circumferential direction.

The shield bottom portion 38 includes a shield bottom opening 42. For example, the shield bottom opening 42 is a circular opening which is formed at the center of the shield bottom portion 38, and has an opening diameter (diameter of opening portion) D.

The shield side portion 40 includes a shield side opening 44 through which the cryocooler structural portion 21 is inserted. The second cooling stage 24 and the second cylinder 25 are inserted from the outside of the radiation shield 30 into the radiation shield 30 through the shield side opening 44. The shield side opening 44 is an attachment hole which is formed on the shield side portion 40, and, for example, has a circular shape. The first cooling stage 22 is disposed outside the radiation shield 30.

The shield side portion 40 includes an attachment seat 46 of the cryocooler 16. The attachment seat 46 is a flat portion for attaching the first cooling stage 22 to the radiation shield 30, and is slightly recessed when viewed from the outside of the radiation shield 30. The attachment seat 46 forms the outer periphery of the shield side opening 44. The first cooling stage 22 is attached to the attachment seat 46. Therefore, the radiation shield 30 is thermally connected to the first cooling stage 22.

Instead of the radiation shield 30 being directly attached to the first cooling stage 22, in an embodiment, the radiation shield 30 may be thermally connected to the first cooling stage 22 via an additional heat transfer member. For example, the heat transfer member may be a short hollow tube having flanges on both ends. The heat transfer member may be fixed to the attachment seat 46 by one end flange, and may be fixed to the first cooling stage 22 by the other end flange. The heat transfer member may surround the cryocooler structural portion 21 and may extend from the first cooling stage 22 to the radiation shield 30. The shield side portion 40 may include the heat transfer member.

In the embodiment shown in the drawings, the radiation shield 30 is configured of an integral tubular shape. Instead of this, the radiation shield 30 may be configured of the entire tubular shape including a plurality of parts. The plurality of parts may be disposed to have gaps to each other. For example, the radiation shield 30 may be divided into two portions in the axial direction. In this case, the upper portion of the radiation shield 30 is a tube having both open ends, and includes the shield front end 36 and a first portion of the shield side portion 40. The lower portion of the radiation shield 30 also is a tube having both open ends, and includes a second portion of the shield side portion 40 and the shield bottom portion 38. A slit is formed, which extends in the circumferential direction between the first portion and the second portion of the shield side portion 40. The slit may form at least a portion of the shield side opening 44. Alternatively, the upper half of the shield side opening 44 may be formed on the first portion of the shield side portion 40, and the lower half thereof may be formed on the second portion of the shield side portion 40.

The radiation shield 30 forms a gas accommodation space 50 which surrounds the second cryopanel unit 20 between the intake port 12 and the shield bottom portion 38. The gas accommodation space 50 is a portion of the internal space 14 of the cryopump 10, and is a region adjacent to the second cryopanel unit 20 in the radial direction.

The inlet cryopanel 32 is provided in the intake port 12 (or, the shield main opening 34, and so forth) to protect the second cryopanel unit 20 from radiant heat from an external heat source (for example, a heat source in the vacuum chamber to which the cryopump 10 is attached) of the cryopump 10. In addition, a gas (for example, water) condensed at the cooling temperature of the inlet cryopanel 32 is captured on the surface.

The inlet cryopanel 32 is disposed at the location corresponding to the second cryopanel unit 20 in the intake port 12. The inlet cryopanel 32 occupies the center portion of the opening area of the intake port 12 and forms an annular opening region 51 between the inlet cryopanel 32 and the radiation shield 30. The opening region 51 is positioned at the location corresponding to the gas accommodation space 50 in the intake port 12. Since the gas accommodation space 50 is positioned at the outer peripheral portion of the internal space 14 so as to surround the second cryopanel unit 20, the opening region 51 is positioned at the outer peripheral portion of the intake port 12. The opening region 51 is an inlet of the gas accommodation space 50, and the cryopump 10 receives gas in the gas accommodation space 50 through the opening region 51.

The inlet cryopanel 32 is attached to the shield front end 36 via an attachment member (not shown). In this way, the inlet cryopanel 32 is fixed to the radiation shield 30 and is thermally connected to the radiation shield 30. The inlet cryopanel 32 approaches the second cryopanel unit 20. However, the inlet cryopanel 32 does not come into contact with the second cryopanel unit 20.

The inlet cryopanel 32 has a flat structure which is disposed in the intake port 12. For example, the inlet cryopanel 32 may include a louver or a chevron which is formed in a concentric shape or a lattice shape, and may include a flat plate (for example, a disk). The inlet cryopanel 32 may be disposed so as to cross the entire intake port 12. In this case, the opening region 51 may be formed by cutting a portion of the plate or cutting webs of some louvers or chevrons.

The second cryopanel unit 20 is provided at the center portion of the internal space 14 of the cryopump 10. The second cryopanel unit 20 includes a plurality of cryopanels 60 and a panel attachment member 62. The panel attachment member 62 extends upward and downward in the axial direction from the second cooling stage 24. The second cryopanel unit 20 is attached to the second cooling stage 24 via the panel attachment member 62. In this way, the second cryopanel unit 20 is thermally connected to the second cooling stage 24. Accordingly, the second cryopanel unit 20 is cooled to the second cooling temperature.

An adsorption region 64 is formed on at least a portion of the surface of the second cryopanel unit 20. The adsorption region 64 is provided so as to capture a non-condensable gas (for example, hydrogen) by adsorption. The adsorption region 64 is formed at a location behind the cryopanel 60 adjacent to the upper side of the adsorption region 64 so as to be not viewed from the intake port 12. That is, the adsorption region 64 is formed on the center portion of the upper surface and the entire lower surface of each cryopanel 60. However, the adsorption region 64 is not provided on the upper surface of a top cryopanel 60a. For example, the adsorption region 64 is formed by bonding an adsorbent (for example, activated carbon) to the surface of the cryopanel.

In addition, a condensation region is formed on at least a portion of the second cryopanel unit 20 so as to capture a condensable gas by condensation. For example, the condensation region is a region in which the absorbent is removed on the surface of the cryopanel, and a cryopanel substrate surface, for example, a metal surface is exposed.

The plurality of cryopanels 60 is disposed on the panel attachment member 62 in the direction (that is, along the center axis A) from the shield main opening 34 toward the shield bottom portion 38. Each of the plurality of cryopanel 60 is a flat plate (for example, a disk) which extends to be perpendicular to the center axis A, and the plurality of cryopanels 60 are attached to the panel attachment member 62 so as to be parallel to each other. For convenience of descriptions, the cryopanel 60 which is closest to the intake port 12 among the plurality of cryopanels 60 is referred to as the top cryopanel 60a, and, the cryopanel 60 which is closest to the shield bottom portion 38 among the plurality of cryopanels 60 is referred to as a bottom cryopanel 60b.

The second cryopanel unit 20 extends so as to be elongated in the axial direction between the intake port 12 and the shield bottom portion 38. A distance from the upper end of the second cryopanel unit 20 to the lower end thereof is longer than the outline dimensions in a perpendicular projection of the second cryopanel unit 20 in the axial direction. For example, a gap between the top cryopanel 60a and the bottom cryopanel 60b is larger than the width or diameter of the cryopanel 60.

As shown in the drawings, the plurality of cryopanels 60 may have the same shape as each other, and may have different shapes (for example, different diameters) from each other. A cryopanel 60 among the plurality of cryopanels 60 may have the same shape as the cryopanel 60 adjacent to the upper portion of the cryopanel 60, or may be larger than the cryopanel 60 adjacent to the upper portion thereof. As a result, the bottom cryopanel 60b may be larger than the top cryopanel 60a. An area of the bottom cryopanel 60b may be approximately 1.5 times to 5 times of an area of the top cryopanel 60a.

Alternatively, as shown in the drawings, the gaps among the plurality of cryopanels 60 may be constant, or may be different from each other.

The cryopump housing 70 is the case of the cryopump 10 which accommodates the first cryopanel unit 18, the second cryopanel unit 20, and the cryocooler 16, and is a vacuum vessel which is configured so as to hold vacuum sealing of the internal space 14. The cryopump housing 70 includes the first cryopanel unit 18 and the cryocooler structural portion 21 in a non-contact manner. The cryopump housing 70 is attached to the room-temperature portion 26 of the cryocooler 16.

The intake port 12 is defined by the front end of the cryopump housing 70. The cryopump housing 70 includes an intake port flange 72 which extends from the front end toward the outside in the radial direction. The intake port flange 72 is provided over the entire periphery of the cryopump housing 70. The cryopump 10 is attached to the vacuum chamber of an evacuation object using the intake port flange 72.

The cryopump housing 70 includes a housing bottom portion 74 which faces the shield bottom opening 42. The housing bottom portion 74 is curved in a dome shape. The inner surface of the housing bottom portion 74 may have a very small radiation rate. For example, the inner surface of the housing bottom portion 74 may be a surface in which a radiation energy amount is 10% or less of a prefect blackbody. In other words, the inner surface of the housing bottom portion 74 may be a reflection surface. In this way, in order to decrease the radiation (increase reflectivity), electro-polishing may be performed on the inner surface of the housing bottom portion 74.

An outflow small hole of a molten material during reproduction is provided in the shield bottom portion of a typical cryopump. The small hole has very small dimensions such the cryopanel inside the shield is not exposed to the housing. Meanwhile, the shield bottom opening 42 is significantly largely opened. A region of the shield bottom portion close to the second cryopanel unit 20 is removed to form the shield bottom opening 42.

A diameter D of the shield bottom opening 42 is larger than a distance B from the second cryopanel unit 20 (that is, bottom cryopanel 60b) to the housing bottom portion 74. For example, the diameter D of the shield bottom opening 42 may be larger than at least 2 times, 3 times, 5 times, or 10 times of the distance B. In this way, a large opening portion is formed in the shield bottom portion 38. Needless to say, the diameter D is smaller than the diameter of the shield main opening 34. For example, the diameter D may be smaller than 90%, 75%, or 50% of the diameter of the shield main opening 34.

In addition, the diameter D of the shield bottom opening 42 corresponds to a diameter C of the bottom cryopanel 60b. The diameter D of the shield bottom opening 42 may be a range of 80% to 120% or 90% to 110% of the diameter C of the bottom cryopanel 60b. In this way, the bottom cryopanel 60b covers the most or entire region of the housing bottom portion 74 when is viewed from the intake port 12. As shown in the drawings, in order to reliably avoid interference between the outer peripheral portion of the flat plate shaped bottom cryopanel 60b and the shield bottom portion 38, the diameter D of the shield bottom opening 42 may be larger than the diameter C of the bottom cryopanel 60b.

Hereinafter, an operation of the cryopump 10 having the above-described configuration will be described. When the cryopump 10 is operated, first, the pressure inside the vacuum chamber is roughly set to approximately 1 Pa by other appropriate roughing pumps before the cryopump 10 is operated. Thereafter, the cryopump 10 is operated. The first cooling stage 22 and the second cooling stage 24 are respectively cooled to the first cooling temperature and the second cooling temperature by driving of the cryocooler 16. Accordingly, the first cryopanel unit 18 and the second cryopanel unit 20, which are thermally connected to the first cooling stage 22 and the second cooling stage 24, are respectively cooled to the first cooling temperature and the second cooling temperature.

The inlet cryopanel 32 cools gas flying from the vacuum chamber toward cryopump 10. Gas is condensed so as to have a sufficiently low vapor pressure (for example, $10^{-8}$ Pa or less) at the first cooling temperature on the surface of the inlet cryopanel 32. This gas may be referred to as a first kind of gas. For example, the first kind of gas is water vapor. In this way, the inlet cryopanel 32 through which the first kind of gas can be exhausted. A portion of gas having a vapor pressure which is not sufficiently low at the first cooling temperature can enter the internal space 14 from the intake port 12. Alternatively, the other portion of the gas is reflected by the inlet cryopanel 32, and does not enter the internal space 14.

The gas entering internal space 14 is cooled by the second cryopanel unit 20. Gas having a sufficiently low vapor pressure (for example, $10^{-8}$ Pa or less) at the second cooling temperature is condensed on the surface of the second cryopanel unit 20. This gas may be referred to as a second kind of gas. For example, the second kind of gas is argon. In this way, the second cryopanel unit 20 can exhaust the second kind of gas.

Gas having a vapor pressure which is not sufficiently low at the second cooling temperature is adsorbed to the adsorption material of the second cryopanel unit 20. This gas may be referred to as a third kind of gas. For example, the third kind of gas is hydrogen. In this way, the second cryopanel unit 20 can exhaust the third kind of gas. Accordingly, the cryopump 10 exhausts various gas by condensation and adsorption, and a vacuum degree of the vacuum chamber can reach a desired level.

As described above, the radiation shield 30 is provided to decrease the radiant heat entering the second cryopanel unit 20. The radiation shield 30 includes the shield bottom opening 42, and the bottom cryopanel 60b is exposed to the housing bottom portion 74. However, since the radiation rate of the housing bottom portion 74 is small, the radiant heat emitted from the housing bottom portion 74 is small. In addition, since the housing bottom portion 74 is approximately covered by the bottom cryopanel 60b and other cryopanels 60 when viewed from the intake port 12, the radiant heat entering the internal space 14 through the intake port 12 from the outside does not directly enter the housing bottom portion 74. Accordingly, the external radiant heat which enters the bottom cryopanel 60b by the reflection on the housing bottom portion 74 is decreases. Accordingly, from the viewpoint of the decrease of the radiant heat, actually, there is less need to provide the shield bottom portion 38.

According to the first embodiment, it is possible to widen a usable space of the second cryopanel unit 20 by providing the shield bottom opening 42. The second cryopanel unit 20 can be disposed so as to be very close to the housing bottom portion 74. Accordingly, since it is possible to extend the axial length of the second cryopanel unit 20, it is possible to provide additional cryopanels 60. For example, it is possible to increase the number of the cryopanels 60. Since the area of the adsorption region 64 increases, it is possible to increase an exhaust speed and a storage amount of a third kind of gas by the cryopump 10. Compared to a general configuration of the related art in which the bottom portion of the radiation shield 30 is closed, for example, it is possible to increase the storage amount of the third kind of gas by approximately 5% to 10%.

Figure 2:
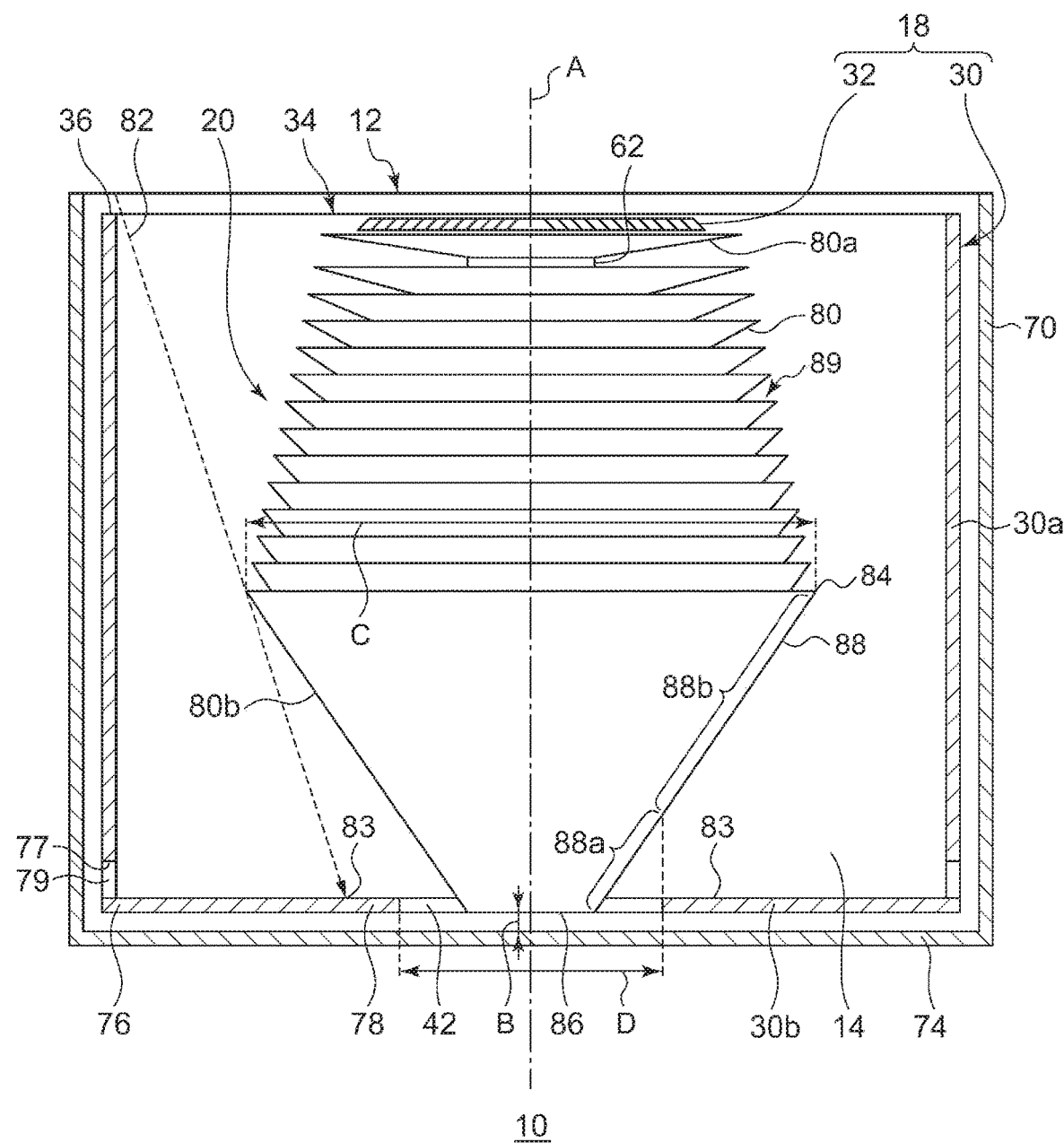
FIG. 2 is a view schematically showing a main portion of a cryopump according to a second embodiment of the present invention.

FIG. 2 is a view schematically showing a main portion of a cryopump 10 according to a second embodiment of the present invention. The cryopump 10 according to the second embodiment is different from the cryopump 10 according to the first embodiment in that the radiation shield 30 has a two-portion configuration. In addition, instead of the flat plate shaped cryopanel 60, the cryopump 10 according to the second embodiment is different from the cryopump 10 according to the first embodiment in that the second cryopanel unit 20 includes a dish-shaped cryopanel 80. Moreover, unlike the first embodiment, the housing bottom portion 74 is not curved in a dome shape and is formed in a flat shape. In addition, for simplification, in FIG. 2, the cryocooler 16 is not shown.

The radiation shield 30 includes a shield cylindrical member 30a and the shield annular plate 30b. In the shield cylindrical member 30a, both ends of the shield main opening 34 side and the housing bottom portion 74 side are opened. The shield annular plate 30b is a doughnut plate-shaped member and is disposed between the shield cylindrical member 30a and the housing bottom portion 74. The shield annular plate 30b includes a plate outer periphery 76 which is disposed to be far from the opening end of the housing bottom portion 74 side of the shield cylindrical member 30a and the plate inner periphery 78 which defines the shield bottom opening 42. The plate outer periphery 76 is slightly separated from an opening end 77 of the shield cylindrical member 30a in the axial direction. A slit 79 is formed between the plate outer periphery 76 and the opening end 77 of the shield cylindrical member 30a.

The shield annular plate 30b is thermally connected to the first cooling stage 22 via the shield cylindrical member 30a. Alternatively, the shield annular plate 30b may be thermally connected to the first cooling stage 22 directly.

The shield bottom opening 42 (that is, the plate inner periphery 78) is disposed inside a boundary 83 which is defined by an intersection between a direct line of sight 82 from the shield front end 36 to the second cryopanel unit 20 and the radiation shield 30. Accordingly, the shield bottom opening 42 cannot be viewed from the intake port 12.

Each cryopanel 80 has a dish shape or an inverted truncated conical shape. The cryopanel 80 may have a mortar shape, a deep dish shape, or a ball shape. The cryopanel 80 has a large dimension (that is, a large diameter) in an upper end section 84, and a dimension (that is, a small diameter), which is smaller than that of the upper end section 84, in the lower end section 86. The cryopanel 80 includes an inclination region 88 which connects the upper end section 84 and the lower end section 86. The inclination region 88 corresponds to a side of an inverted truncated cone. The inclination region 88 is inclined such that the tangential line intersects the center axis A. In addition, hereinafter, an angle between a plane perpendicular to the center axis A and the surface of the cryopanel 80 may be referred to as the inclination angle of the cryopanel. The cryopanel 80 is attached to the panel attachment member 62 at the lower end section 86. An adsorption region of the non-condensable gas is provided in at least one of the front surface and the rear surface of the cryopanel 80.

The plurality of cryopanels 80 are arranged in a nested shape or are arranged to overlap each other in the axial direction. The plurality of cryopanels 80 are coaxially disposed with the center axis A of the radiation shield 30.

The cryopanel 80 which is close to the intake port 12 is smaller than the cryopanel 80 which is far from the intake port 12. In two cryopanels 80 adjacent to each other, the upper cryopanel has a diameter which is smaller than that of the lower cryopanel. In addition, in two cryopanels 80 adjacent to each other, the upper cryopanel has a depth (that is, an axial length from the upper end section 84 to the lower end section 86) which is smaller than that of the lower cryopanel. Accordingly, the inclination region 88 of the upper cryopanel has an inclination angle which is larger than that of the inclination region 88 of the lower cryopanel. Therefore, the upper cryopanel of two cryopanels 80 adjacent to each other is accommodated in the lower cryopanel except for the upper end section.

In this way, an inverted truncated conical deep gap 89 is formed between two cryopanels. The depth of the gap 89 is larger than the width of the gap inlet. For example, the depth of the gap 89 may be larger than 2 times, 3 times, 5 times, or 10 times of the width of the gas inlet. The second cryopanel unit 20 has the above-described deep gap structure, and it is possible to increase capturing rate of a third kind of gas, for example, hydrogen. That is, hydrogen molecules which enter the gap 89 can be captured without being discharged to the outside if necessary.

As shown in the drawings, a top cryopanel 80a has the minimum diameter and the minimum depth, and a bottom cryopanel 80b has the maximum diameter and the maximum depth. In addition, the top cryopanel 80a has the minimum inclination angle and the bottom cryopanel 80b has the maximum inclination angle.

The bottom cryopanel 80b includes the lower end section 86 which directly faces the housing bottom portion 74 through the shield bottom opening 42. In addition, the inner peripheral portion 88a of the inclination region 88 of the bottom cryopanel 80b directly faces the housing bottom portion 74 through the shield bottom opening 42. The shield annular plate 30b is disposed between the outer peripheral portion 88b of the inclination region 88 of the bottom cryopanel 80b and the housing bottom portion 74.

Similarly to the first embodiment, the diameter D of the shield bottom opening 42 is larger than the distance B from the second cryopanel unit 20 (that is, bottom cryopanel 80b) to the housing bottom portion 74. However, unlike the first embodiment, the diameter D of the shield bottom opening 42 is smaller than the maximum diameter C (that is, the diameter of the upper end section 84) of the bottom cryopanel 80b. Since the bottom cryopanel 80b has the small-diameter lower end section 86, the most or the entire region of the housing bottom portion 74 can be covered by the bottom cryopanel 80b.

As shown in FIG. 2, the lower end section 86 of the bottom cryopanel 80b is positioned at the same position as that of the shield annular plate 30b (that is, shield bottom opening 42) in the axial direction. However, the lower end section 86 of the bottom cryopanel 80b may be disposed above or below the shield annular plate 30b in the axial direction.

According to the cryopump 10 of the second embodiment, similar effects as those of the cryopump 10 of the first embodiment can be exerted. That is, it is possible to increase the exhaust speed and the storage amount of the third kind of gas by the cryopump 10 without occurrence of thermal disadvantages even when the shield bottom opening 42 is provided.

Figure 3:
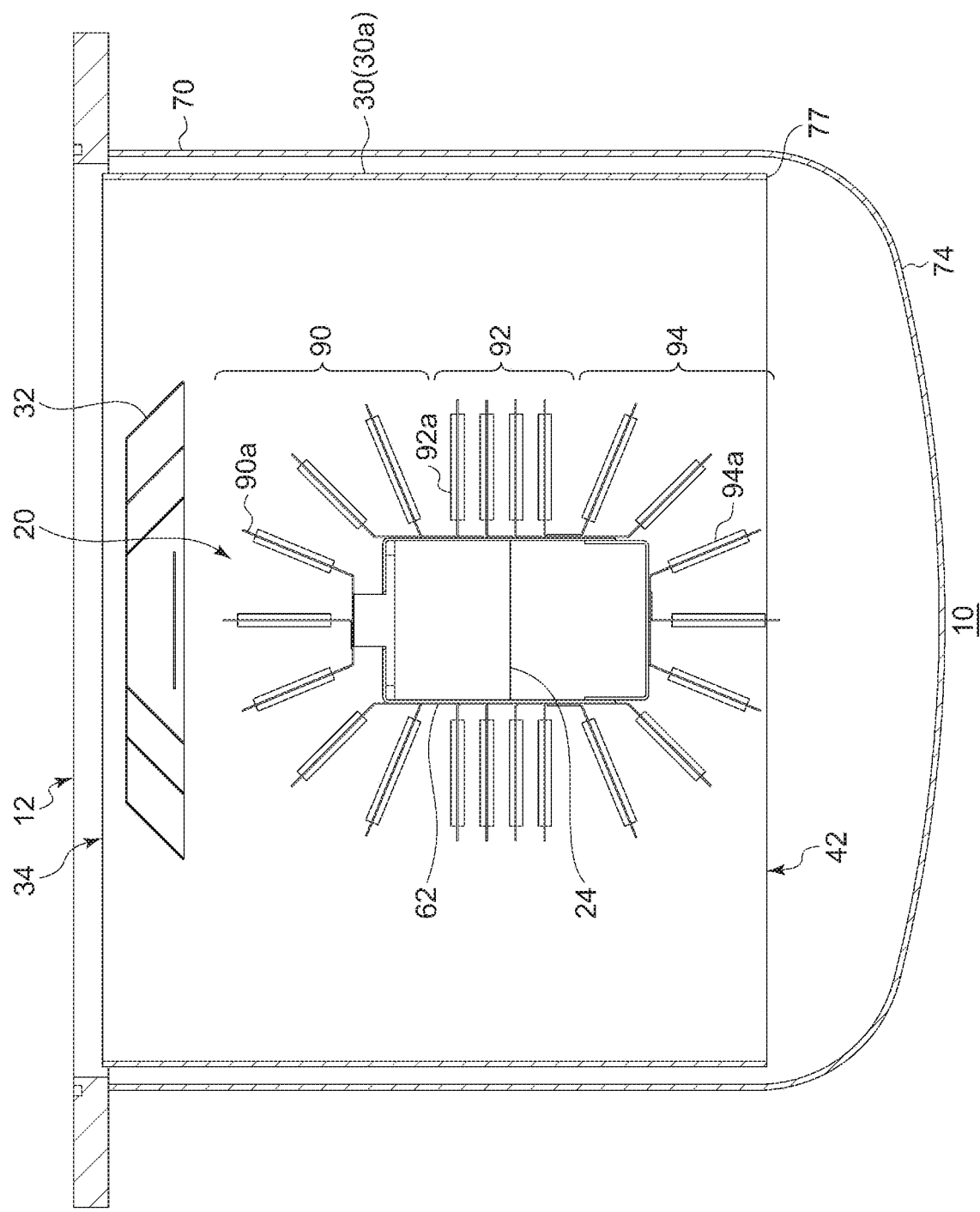
FIG. 3 is a view schematically showing a main portion of a cryopump according to a third embodiment of the present invention.

FIG. 3 is a view schematically showing a main portion of a cryopump 10 according to a third embodiment of the present invention. The cryopump 10 according to the third embodiment is different from the cryopump 10 according to the second embodiment in that the radiation shield 30 includes only the shield cylindrical member 30a and does not include the shield annular plate 30b. Accordingly, the shield bottom opening 42 is defined by the opening end 77 on the housing bottom portion 74 side of the shield cylindrical member 30a. That is, the radiation shield 30 does not include the shield bottom portion. In this case, since the radiation shield 30 has a simple shape, it is possible to easily manufacture the radiation shield 30.

Moreover, the cryopump 10 according to the third embodiment is different from the cryopump 10 according to the second embodiment with respect to the second cryopanel unit 20. The second cryopanel unit 20 includes a cryopanel unit upper portion 90 which is disposed on the intake port 12 side, a cryopanel unit intermediate portion 92, and a cryopanel unit lower portion 94 which is disposed on the housing bottom portion 74 side. The cryopanel unit intermediate portion 92 is disposed between the cryopanel unit upper portion 90 and the cryopanel unit lower portion 94. The cryopanel unit upper portion 90 includes a plurality of cryopanels 90a which protrude from the panel attachment member 62 toward the intake port 12 in the radial direction. The cryopanel unit intermediate portion 92 includes a plurality of flat plate-shaped cryopanels 92a. The cryopanel unit lower portion 94 includes a plurality of cryopanels 94a which protrude from the panel attachment member 62 toward the housing bottom portion 74 in the radial direction.

As shown in FIG. 3, the diameter (that is, the diameter of the shield main opening 34) of the shield bottom opening 42 is larger than the distance from the second cryopanel unit 20 to the housing bottom portion 74.

The shield bottom opening 42 is larger than the second cooling stage 24. The area of the shield bottom opening 42 is larger than the projection area of the second cooling stage 24 in the axial direction. Since the second cooling stage 24 is positioned on the center axis A of the cryopump 10, the shield bottom opening 42 surrounds the second cooling stage 24 when viewed along the center axis A of the cryopump 10. The diameter of the shield bottom opening 42 is larger than the dimension of the second cooling stage 24. Here, for example, the dimension of the second cooling stage 24 are the outline dimension of the second cooling stage 24 when viewed along the center axis of the cryocooler 16, and for example, is the diameter or the radial width of the second cooling stage 24. Similarly to the first and second embodiments, the shield bottom opening 42 may be larger than the second cooling stage 24.

The panel attachment member 62 includes a set of attachment plates which are respectively attached to both sides of the second cooling stage 24. At least the cryopanel unit intermediate portion 92 is attached to the attachment plates. The diameter of the shield bottom opening 42 may be larger than the dimension (for example, the gap between the set of attachment plates) of the panel attachment member 62.

According to the cryopump 10 of the third embodiment, effects similar to those of the first and second embodiments can be exerted.

Hereinbefore, embodiments of the present invention are described. It should be understood that the invention is not limited to the above-described embodiment, but may be modified into various forms on the basis of the spirit of the invention. Additionally, the modifications are included in the scope of the invention.

The shape of the shield bottom opening 42 is not limited to a circle, and may have any shape such as a rectangular shape or an elliptical shape. The dimension (for example, the diameter, the width, or the like) of the shield bottom opening 42 is larger than the distance from the second cryopanel unit 20 to the housing bottom portion 74.

The radiation shield 30 and the second cryopanel unit 20 described in the first to third embodiments may be arbitrarily combined. For example, the integral radiation shield 30 of the first embodiment may be combined with the second cryopanel unit 20 in the nested array of the second embodiment, and may be combined with the second cryopanel unit 20 of the third embodiment. Similarly, the radiation shield 30 having a two-portion configuration of the second embodiment may be combined with the second cryopanel unit 20 of the first embodiment or the third embodiment. The tubular radiation shield 30 having both open ends of the third embodiment may be combined with the second cryopanel unit 20 of the first embodiment or the second embodiment.

What is claimed is:

1. A cryopump comprising:
   a cryocooler which includes a first cooling stage which is cooled to a first cooling temperature, a second cooling stage which is cooled to a second cooling temperature which is lower than the first cooling temperature, and a cryocooler structural portion which structurally supports the second cooling stage to the first cooling stage;
   a cryopanel unit which is thermally connected to the second cooling stage;
   a radiation shield which includes a shield main opening, a shield side opening, and a shield bottom opening, encloses the second cooling stage and the cryopanel unit, and is thermally connected to the first cooling stage in a state where the cryocooler structural portion is inserted into the shield side opening; and
   a cryopump housing which encloses the radiation shield and has a housing bottom portion which faces the shield bottom opening,
   wherein a diameter of the shield bottom opening is larger than a distance from the cryopanel unit to the housing bottom portion.

2. The cryopump according to claim 1,
   wherein the radiation shield includes a shield front end which defines the shield main opening, and the shield bottom opening is disposed inside a boundary which is defined by an intersection between a direct line of sight from the shield front end to the cryopanel unit and the radiation shield.

3. The cryopump according to claim 1,
   wherein the radiation shield includes a shield cylindrical member having an end of a shield main opening side and an end of housing bottom portion side which are open.

4. The cryopump according to claim 3,
   wherein the radiation shield further includes a shield annular plate which has a plate outer periphery disposed to be far from the end of the housing bottom portion side of the shield cylindrical member and a plate inner periphery defining the shield bottom opening.

5. The cryopump according to claim 3,
   wherein the shield bottom opening is defined by the end of the housing bottom portion side of the shield cylindrical member.

6. The cryopump according to claim 1,
   wherein the shield bottom opening is larger than the second cooling stage.

7. The cryopump according to claim 1,
   wherein the cryopanel unit includes a bottom cryopanel facing the shield bottom opening, the bottom cryopanel including an upper open end and a lower closed end, the upper open end being larger than the lower closed end in diameter.

8. The cryopump according to claim 7,
   wherein the diameter of the shield bottom opening is larger than a diameter of the lower closed end of the bottom cryopanel.

9. The cryopump according to claim 7,
   wherein the lower closed end of the bottom cryopanel directly faces the housing bottom portion through the shield bottom opening.

10. The cryopump according to claim 7,
    wherein the bottom cryopanel includes an inverted truncated conical surface connecting the upper open end and the lower closed end,
    wherein an inner peripheral portion of the inverted truncated conical surface and the lower closed end directly face the housing bottom portion through the shield bottom opening.

11. The cryopump according to claim 7,
    wherein the radiation shield includes a shield annular plate having the shield bottom opening, the shield annular plate arranged between the upper open end of the bottom cryopanel and the housing bottom portion.

12. The cryopump according to claim 11,
    wherein the bottom cryopanel includes an inverted truncated conical surface connecting the upper open end and the lower closed end,
    wherein the shield annular plate is arranged between an outer peripheral portion of the inverted truncated conical surface and the housing bottom portion.

13. The cryopump according to claim 1,
wherein the shield bottom opening is circular or rectangular.

14. The cryopump according to claim 1,
wherein the diameter of the shield bottom opening is larger than twice the distance from the cryopanel unit to the housing bottom portion.

* * * * *